United States Patent
Corl, Jr. et al.

(10) Patent No.: US 6,917,946 B2
(45) Date of Patent: Jul. 12, 2005

(54) METHOD AND SYSTEM FOR PARTITIONING FILTER RULES FOR MULTI-SEARCH ENFORCEMENT

(75) Inventors: Everett Arthur Corl, Jr., Raleigh, NC (US); Olga Golovanevsky, Haifa (IL); Clark Debs Jeffries, Durham, NC (US); Robert Franklin Kantner, Jr., Chapel Hill, NC (US); Randall William Worzella, Wake Forest, NC (US); Avraham Zehavi, Naharia (IL)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 10/218,950

(22) Filed: Aug. 12, 2002

(65) Prior Publication Data

US 2004/0030424 A1 Feb. 12, 2004

(51) Int. Cl.[7] ............................................. G06F 17/30
(52) U.S. Cl. ...................................... 707/102; 707/101
(58) Field of Search .......................... 707/10, 101, 102, 707/104.1; 700/90; 701/57; 706/46; 709/206, 223, 224, 249

(56) References Cited

U.S. PATENT DOCUMENTS

| | | | |
|---|---|---|---|
| 5,327,366 A | 7/1994 | Mau | 708/321 |
| 5,361,353 A | 11/1994 | Carr et al. | 719/313 |
| 5,835,727 A | 11/1998 | Wong et al. | 709/238 |
| 5,951,651 A | 9/1999 | Lakshman et al. | 709/239 |
| 6,009,475 A | 12/1999 | Shrader | 709/249 |
| 6,088,805 A | 7/2000 | Davis et al. | 713/202 |
| 6,138,156 A | * 10/2000 | Fletcher et al. | 709/224 |
| 6,147,976 A | 11/2000 | Shand et al. | 370/254 |
| 6,167,445 A | * 12/2000 | Gai et al. | 709/223 |
| 6,289,013 B1 | 9/2001 | Lakshman et al. | 370/389 |
| 6,298,340 B1 | 10/2001 | Calvignac et al. | 707/3 |
| 6,301,669 B2 | 10/2001 | Boden et al. | 713/201 |
| 6,341,130 B1 | 1/2002 | Lakshman et al. | 370/389 |
| 6,473,763 B1 | * 10/2002 | Corl et al. | 707/101 |
| 6,539,394 B1 | * 3/2003 | Calvignac et al. | 707/102 |

* cited by examiner

*Primary Examiner*—Apu M. Mofiz
(74) *Attorney, Agent, or Firm*—Sawyer Law Group LLP (57) ABSTRACT

A method and system for storing a plurality of filter rules in a computer system is disclosed. The plurality of filter rules uses at least one range of values in at least one dimension. The method and system include separating a portion of the plurality of filter rules into a plurality of pure subsets of filter rules. Each of the plurality of pure subsets of filter rules includes at least one of the plurality of filter rules. The method and system also include combining a portion of the plurality of pure subsets of filter rules to provide a combined subset and determining whether an efficiency of utilizing the plurality of filter rules is improved by combining the portion of the plurality of pure subsets of filter rules. The method and system further includes storing the plurality of filter rules including storing the portion of the plurality of subsets of filter rules as the combined subset if the efficiency of searching the plurality of filter rules is improved.

27 Claims, 4 Drawing Sheets

Prior Art

Figure 1

Prior Art

METHOD AND SYSTEM FOR PARTITIONING FILTER RULES FOR MULTI-SEARCH ENFORCEMENT

FIELD OF THE INVENTION

The present invention relates to computer systems, and more particularly to a method and system for more efficiently searching filter rules for a match for a key.

BACKGROUND OF THE INVENTION

Figure 1:
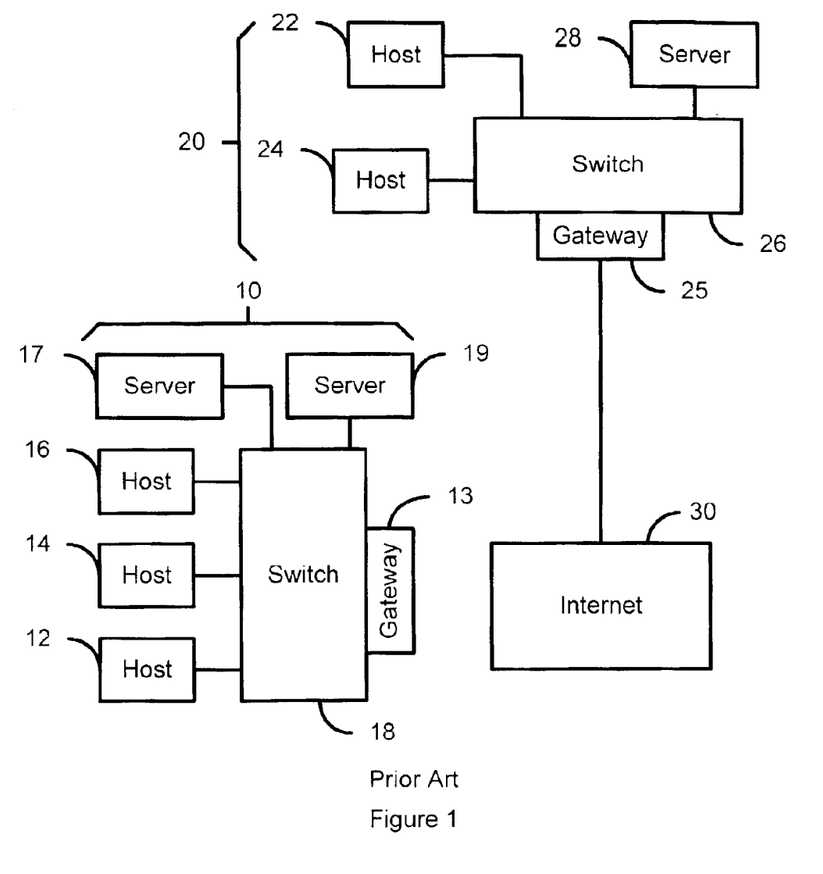
FIG. 1 is a diagram of computer systems of networks in which the present invention can be used.

FIG. 1 depicts conventional networks 10 and 20 which may be connected to the Internet 30. Each network 10 and 20 includes host 12, 14 and 16 and 22 and 24, respectively. Each network 10 and 20 also includes a switch 18 and 26, respectively, and may include one or more servers such as the servers 17, 19 and 28, respectively. In addition, each network 10 and 20 may include one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general.

Figure 2:
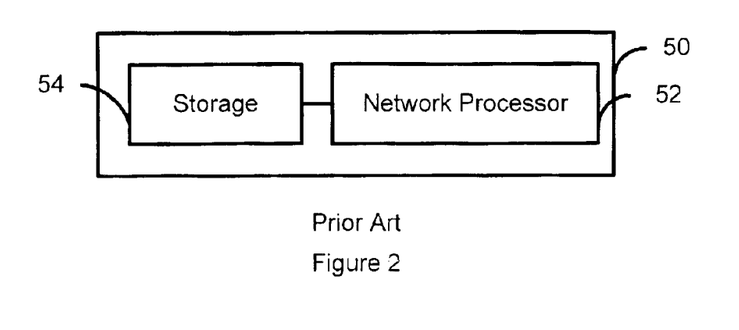
FIG. 2 is a diagram of a switch in which the present invention can be used.

FIG. 2 depicts a portion of a typical switch 50, which may be used for the switches 18 and 26 and/or a router (not shown). The switch 50 includes a network processor 52 and storage 54. The switch 50 typically also includes other components (not shown). The network processor 52 manages functions of the switch, including the classification of packets using the rules described below. The storage 54 retains data relating to the rules.

Referring to FIGS. 1 and 2, in order to manage communications in a network, such as the network 10 or 20, filter rules are used. Filter rules are typically employed by switches, routers and other portions of the network to perform packet classification. Each filter rule is used to classify packets which are being transmitted via a network in order to determine how the packet should be treated and what services should be performed. For example, a filter rule may be used in testing packets entering the network from an outside source to ensure that attempts to break into the network can be thwarted. For example, traffic from the Internet 30 entering the network 10 may be tested in order to ensure that packets from unauthorized sources are denied entrance. Similarly, packets from one portion of a network may be prevented from accessing another portion of the network. For example, a packet from some of the hosts 12, 14 or 16 may be prevented access to either the server 17 or the server 19. The fact that the host attempted to contact the server may also be recorded so that appropriate action can be taken by the owner of the network. Such filter rules may also be used to transmit traffic based on the priorities of packets. For example, packets from a particular host, such as the host 12, may be transmitted because the packets have higher priority even when packets from the hosts 14 or 16 may be dropped. The filter rules may also be used to ensure that new sessions are not permitted to be started when congestion is high even though traffic from established sessions is transmitted. Other functions could be achieved based on the filter rule.

Filter rules also typically have a priority. The filter rules can also interact based on the priority for each of the filter rules. The priority of filter rules can be used to determine the action taken when a key matches the ranges for two or more filter rules. In such a case, the filter rule having a higher priority controls the action taken. For example, a first rule may be a default rule, which treats most cases. A second rule can be an exception to the first rule. The second rule would typically have a higher priority than the first rule to ensure that where a packet matches both the first and the second rule, the second rule will be enforced. In a conventional system, all of the filter rules are placed in a list based upon their priority. Also in a conventional system, each filter rule has a different priority reflected by its position in the list. Thus, in a conventional system the number of priorities is the same as the number of filter rules. Thus, in a conventional system, the number of priorities of filter rules is large In order to determine whether a particular rule will operate on a particular packet, a key is tested. The key that is typically used is the Internet Protocol (IP) header of the packet and other headers of the packet. The IP header typically contains the IP Source Address (SA) the IP Destination Address (DA) and a Type or Protocol (P) field. The IP packet payload typically encapsulates another header and payload structure and the inner structure is typically Transmission Control Protocol (TCP), User Datagram Protocol (UDP), or another standard structure. The header of the TCP, UDP, or other standard structure in turn contains Source Port (SP) and Destination Port (DP) values. These fields are typically ordered as SA, DA, SP, DP and P and are thirty-two, thirty-two, sixteen, sixteen and eight bits, respectively. Rules typically operate on one or more of these fields. For example, based on the source and/or destination addresses, the rule may determine whether a packet from a particular host is allowed to reach a particular destination address.

Furthermore, the key often contains additional bits other than the above fields. For example, a TCP SYN packet, which starts a session, may be characterized differently than a TCP DATA packet for an existing session. This characterization is accomplished using bits in addition to the above fields. The additional bits may be used by a filter rule which manages traffic through a network. For example, when the network is congested, the filter rule may proactively drop the TCP SYN packet while transmitting TCP packets for existing sessions. These operations allow the network to continue to operate and help reduce congestion. In order to perform this function, however, the rule examines the SYN bit in the TCP header to determine whether the packet is part of the Synchronization process of TCP. Thus, the filter rules typically operate using a key that includes at least some fields of the IP header and other headers of a packet and may include additional bits.

In testing a key, it is determined whether to enforce a filter rule against a particular packet and thus classify the packet. The key is tested by determining whether certain fields for key are within the range(s) of the rule. Each rule contains a range of values or one exact value in one or more dimensions. Each dimension corresponds to a field of the key (typically the IP header or other header). One type of filter rule field range may be a single value. In such a case, the key would have to exactly match the value for the rule to operate on the packet. Other rules have some field ranges that consist of all the binary values with a certain number of contiguous bits starting with the most significant bit fixed and other contiguous bits ending with the least significant bit arbitrary. In such a case the fixed bits are called a prefix. The prefix is a binary number containing a number of ones and zeroes (1 or 0) followed by place holders, or wildcards (*). The lower bound of the range is obtained by replacing all of the wildcards by zeros. The upper bound of the range is determined by replacing all of the wildcards by a one. Other rules have arbitrary ranges. Arbitrary ranges are ranges that cannot be expressed using a single prefix. However, an arbitrary range can be expressed using multiple prefixes.

A variety of mechanisms can be used in searching the filter rules for a match for the key. For example, if a particular dimension of a filter rule requires an exact match, then the search may include searching a table of hashed values for the filter rule. The search of other filter rules for a match to a key may require traversing a binary decision tree or other mechanism. Depending upon the mechanism used to search the filter rules as well as the filter rules the efficiency of the search may vary.

Accordingly, what is needed is a system and method for improving the efficiency of searches of the filter rules for a match to the key. The present invention addresses such a need.

SUMMARY OF THE INVENTION

The present invention provides a method and system for storing a plurality of filter rules in a computer system. The plurality of filter rules uses at least one range of values in at least one dimension, also called a field. The method and system comprise separating a portion of the plurality of filter rules into a plurality of pure subsets of filter rules. Each of the plurality of pure subsets of filter rules includes at least one of the plurality of filter rules. The method and system also comprise combining a portion of the plurality of pure subsets of filter rules to provide a combined subset and determining whether an efficiency utilizing the plurality of filter rules is improved by combining the portion of the plurality of pure subsets of filter rules. Yet additional recombinations of subsets of filter rules, pure or otherwise, are taken if the result is yet more improvement in speed of enforcement and/or storage efficiency of the resulting subsets. The method and system further comprise storing the plurality of filter rules including the portion of the plurality of subsets of filter rules that have been combined if the efficiency of searching and/or storing the plurality of filter rules is improved.

According to the system and method disclosed herein, the present invention provides a mechanism for partitioning subsets of filter rules which can improve the storage efficiency and/or enforcement speed of the filter rules for matches to a key.

DETAILED DESCRIPTION OF THE INVENTION

The present invention relates to an improvement in packet classification. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for storing a plurality of filter rules in a computer system. The plurality of filter rules uses at least one range of values in at least one dimension or field. The method and system comprise separating a portion of the plurality of filter rules into a plurality of pure subsets of filter rules. Each of the plurality of pure subsets of filter rules includes at least one of the plurality of filter rules. The method and system also comprise combining a portion of the plurality of pure subsets of filter rules to provide a combined subset and determining whether an efficiency of using the plurality of filter rules is improved by combining the portion of the plurality of pure subsets of filter rules. Yet additional recombinations of subsets of filter rules, pure or otherwise, are taken if the result is yet more improvement in the speed of enforcement and/or efficiency of storage of the resulting subsets. The method and system further comprise storing the plurality of filter rules including the portion of the plurality of subsets of filter rules that have been combined if the efficiency of using the plurality of filter rules is improved.

The present invention will be described in terms of a particular set of rules. However, one of ordinary skill in the art will readily recognize that this method and system will operate effectively for other rules using other ranges. One of ordinary skill in the art will also readily recognize that the method and system operate effectively for other systems using rules for other tasks. However, nothing prevents the application of the method and system to other rules.

Figure 3:
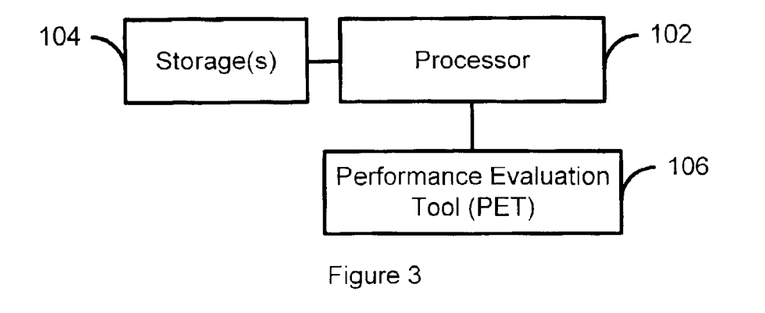
FIG. 3 is a block diagram depicting one embodiment of a system in accordance with the present invention that stores filter rules for improved efficiency of enforcement.

To more particularly illustrate the method and system in accordance with the present invention, refer now to FIG. 3, depicting a block diagram depicting one embodiment of a system 100 in accordance with the present invention that utilizes a ternary content addressable memory (TCAM) for storing data relating to filter rules. The system 100 is preferably used in a network such as the networks 10 and 20. More particularly, the system 100 is preferably used in a component such as the switch 18 or 26. However, the system 100 could be used in another portion of a computer system. The system 100 is thus used with filter rules. The filter rules have ranges in one or more dimensions. These dimension correspond to fields of a key, which includes the fields of an IP header or other header. Each of the ranges can be described by one or more prefixes.

The system 100 includes a processor 102, a storage 104 and a performance evaluation tool ("PET106"). The storage 104 is preferably analogous to the storage 54 and is used for storing data relating to the filter rules. The processor 102 preferably performs functions, described below, such as partitioning the filter rules into pure subsets and aiding in combining the pure subsets of filter rules. A pure subset of filter rules is a set of filter rules with N (typically five) fields labeled i=1, 2, 3, ..., N. For each field i, exactly one of three possibilities must hold. Field i in every rule can be exact with possibly different values rule to rule; field i in every rule can be completely wildcard; or field i in every rule can be one and the same common prefix. For example, the filter following filter rules having the following fields are together a pure subset.

TABLE 1

| Rule | Source Address | Dest. Address | Source Port | Dest. Port | Protocol |
| --- | --- | --- | --- | --- | --- |
| R1 | 1.2.3.4 | 5.6.7.8 | 80 | * | 6 |
| R2 | 1.2.3.4 | 5.6.7.20 | 80 | * | 6 |
| R3 | 1.2.3.4 | 5.6.7.52 | 80 | * | 6 |
| R4 | 1.2.3.4 | 5.6.7.79 | 80 | * | 6 |
| R5 | 1.2.3.4 | 5.6.7.113 | 80 | * | 6 |

The filter rules R1, R2, R3, R4 and R5 have identical source addresses, source ports and protocols. These fields for R1, R2, R3, R4 and R5 also require an exact match. The destination address for filter rules R1, R2, R3, R4 and R5 are all described by the same prefix 5.6.7. The destination port for all of the filter rules R1, R2, R3, R4 and R5 can have any value. Thus, the filter rules R1, R2, R3, R4 and R5 form a pure subset.

The PET 106 can be used to evaluate the performance of a system, such as a switch, which uses certain sets of filter rules. The PET 106 preferably takes into account the types of searches performed for filter rules, the number of filter rules being searched and the mechanisms, such as a binary decision tree or TCAM, that are used to perform the searches. The PET 106 is used to evaluate the efficiency of different combinations of filter rules, as described below. In a preferred embodiment, the PET 106 measures the cost of storing the filter rules and/or the speed of enforcing the filter rules.

Figure 4:
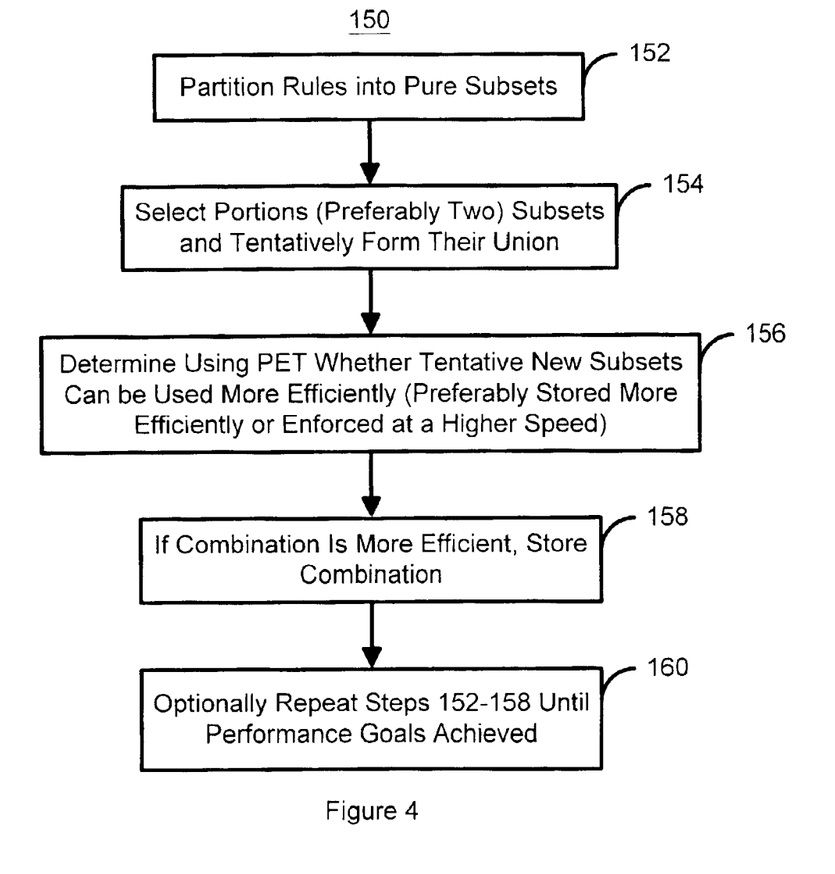
FIG. 4 is a high-level flow chart depicting one embodiment of a method in accordance with the present invention for storing data relating to filter rules in a computer system.

FIG. 4 is a high-level flow chart depicting one embodiment of a method 150 in accordance with the present invention for storing data relating to filter rules in a computer system. The method 150 is preferably implemented using the system 100. The method 150 is performed on a set of filter rules that are to be used in a computer system, for example the switch 18 or 26. The filter rules are partitioned into pure subsets, via step 152. Step 152 is performed using the processor 102. Some of the pure subsets are tentatively combined to provide a combined subset, via step 154. In a preferred embodiment, two subsets of filter rules are tentatively combined in step 154. Step 154 preferably combines subsets having the largest number of rules (elements) first. It is determined whether the efficiency of utilizing the filter rules is improved by the combination, via step 156. In a preferred embodiment, the efficiency of using the filter rules is given by the cost of storing the filter rules or the speed of enforcing the filter rules. The efficiency of using the filter rules could also be a combination of the cost of storing the filter rules and the speed of enforcing the filter rules. If the efficiency of using the filter rules is improved, the filter rules are stored in the combination(s) obtained in step 154, via step 158. Otherwise, the combination(s) are not stored. Steps 154–158 may then be performed again to further improve the performance of searching the filter rules, via step 160. In a preferred embodiment, steps 154–158 are repeated until performance is no longer enhanced by combining portions of the filter rules. However, in another embodiment, another goal could be used. For example, steps 154–158 could be repeated until a particular performance level is reached or until the improvement in performance achieved by further combinations is at or below a certain level. Steps 154–158 are, thus repeated until a desired performance goal is achieved.

Thus, using the method 150 and the system 100, the filter rules are partitioned into pure subsets. Searches of pure subsets are typically simpler and more efficient. For example, in the pure subset of rules in Table 1, the hash could ignore all key fields except the Destination Address field. In addition, subsets formed by repeated application of the method 150 are joined (form the union of some pair) until no further performance improvement is possible or until some other criterion is met. If a combination of the subsets does not increase the efficiency of searching the filter rules, then the combination is not stored in the method 150. However, if the combination improves the efficiency, then the subsets in the combination are stored together and, therefore, searched together. Consequently, performance of a computer system, such as the switch 18 or 26, using the method 150 and/or the system 100 is improved.

Figure 5:
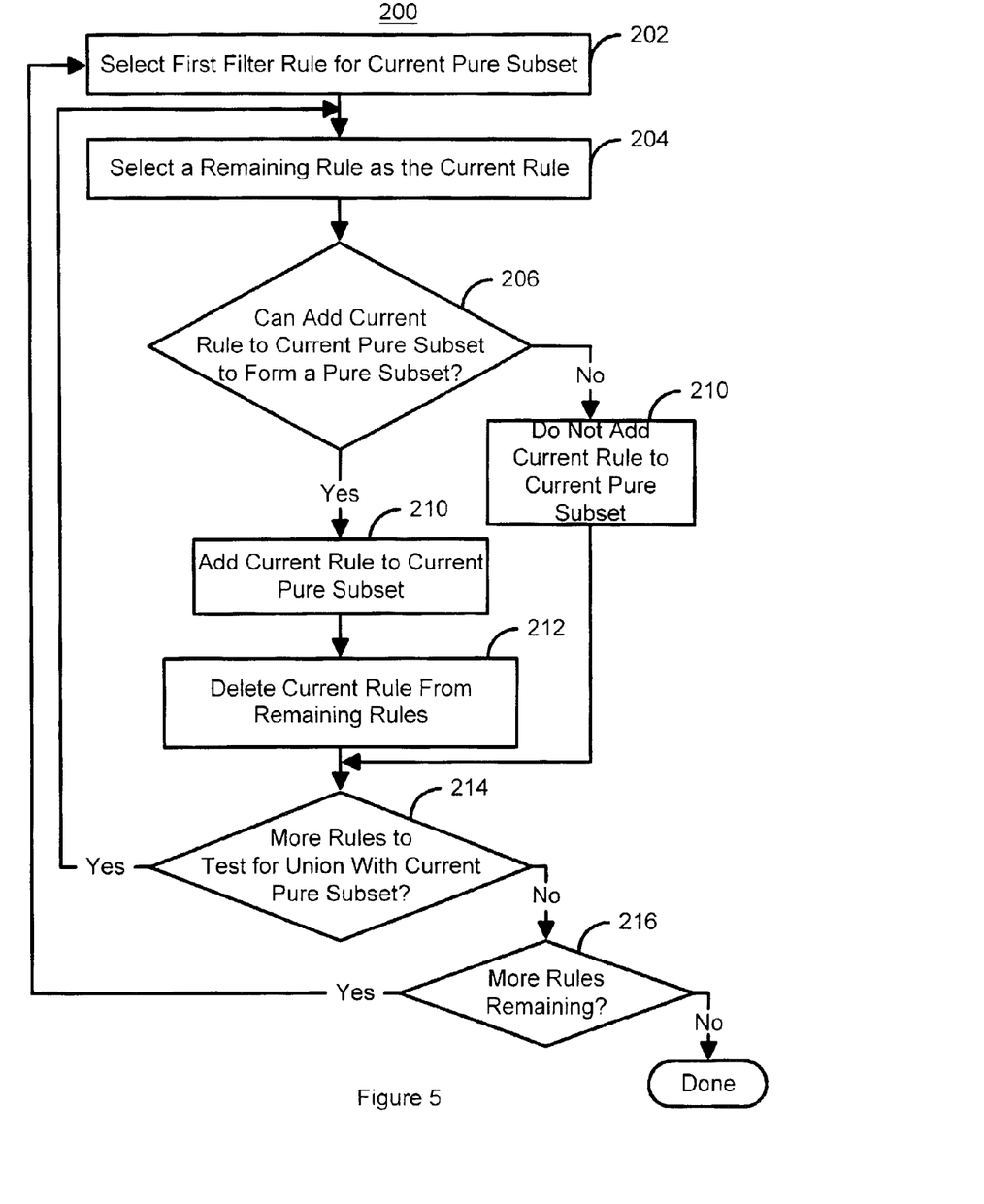
FIG. 5 is a flow chart depicting one embodiment of a method in accordance with the present invention for partitioning filter rules in a computer system into pure subsets.

FIG. 5 is a flow chart depicting one embodiment of a method 200 in accordance with the present invention for partitioning filter rules in a computer system into pure subsets. One of the filter rules is selected to be part of a current pure subset, via step 202. Step 202 also preferably includes removing the filter rule from a list of the filter rules for the computer system. One of the remaining filter rules is selected as the current rule, via step 204. It is determined whether the current rule can be added to the current pure subset to form a subset that is also pure, via step 206. Thus, step 206 may include testing the current rule to ensure that the fields of the current filter rule require exact match(es) and are identical to the corresponding field(s) of the filter rule(s) in the current subset, can be described a prefix that is identical to the prefix for the corresponding field(s) of the filter rule(s) in the subset or can be described by all wildcards as for the corresponding field(s) of the filter rule(s) in the subset.

If it is determined that the current filter rule cannot be added to the current pure subset and form a new subset that is also pure, then the current rule is not added to the current pure subset, via step 208. If the current filter rule can be added to the current pure subset to form a new subset that is also pure, then the current rule is added to the current pure subset, via step 210. In addition, the current rule is deleted from the list of the rules, via step 212.

It is determined whether there are any rules remaining to be tested for union with the current pure subset, via step 214. If so, then step 204 is returned to and another current filter rule selected. If all of the filter rules have been tested for inclusion in the current pure subset, then it is determined whether there are any filter rules remaining (that have not been deleted), via step 216. If not, the method 200 terminates. Otherwise, step 202 is returned to, and another pure subset is formed.

Thus, using the method 200, the filter rules can be partitioned into pure subsets. The method 200 is thus preferably used to perform step 152 of the method 150 depicted in FIG. 4. Referring back to FIG. 5, the method 152 partitions the filter rules for the computer system into as many pure subsets as required to account for all of the filter rules of the computer system. Once the filter rules are partitioned into pure subsets, the pure subsets can be combined, as described below.

Figure 6:
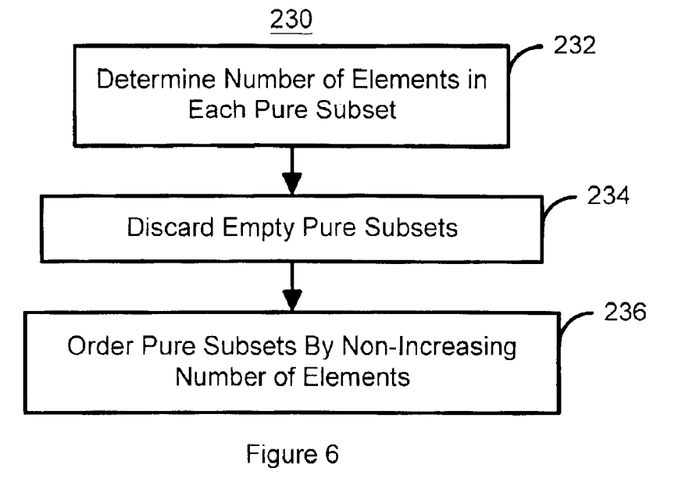
FIG. 6 is a flow chart of one embodiment of a method in accordance with the present invention for ranking the pure subsets of filter rules.

FIG. 6 is a flow chart of one embodiment of a method 230 in accordance with the present invention for ranking the pure subsets of filter rules. In a preferred embodiment, the method 230 is used to prepare the pure subsets of filter rules for combining in step 154 of the method 150 depicted in FIG. 4. Referring back to FIG. 6, the number of elements in each pure subset is determined, via step 232. Any empty subsets may then be discarded, via step 234. The pure subsets are listed in order by nonincreasing number of elements, via step 236. Thus, using the method 230, the pure subsets are listed starting with a pure subset having the largest number of entries and ending with a pure subset having the smallest number of entries. As a result, when step 154, or the method 250, described below, is performed in conjunction with the method 230, the pure subsets having the largest number of elements will be tested for union with other subsets first. Consequently, the method 230 may allow the methods 150 and 250 to more rapidly result in a combination of pure subsets that improves the storage efficiency or search speed of enforcing (the efficiency of using) the filter rules for a match to a key.

Figure 7:
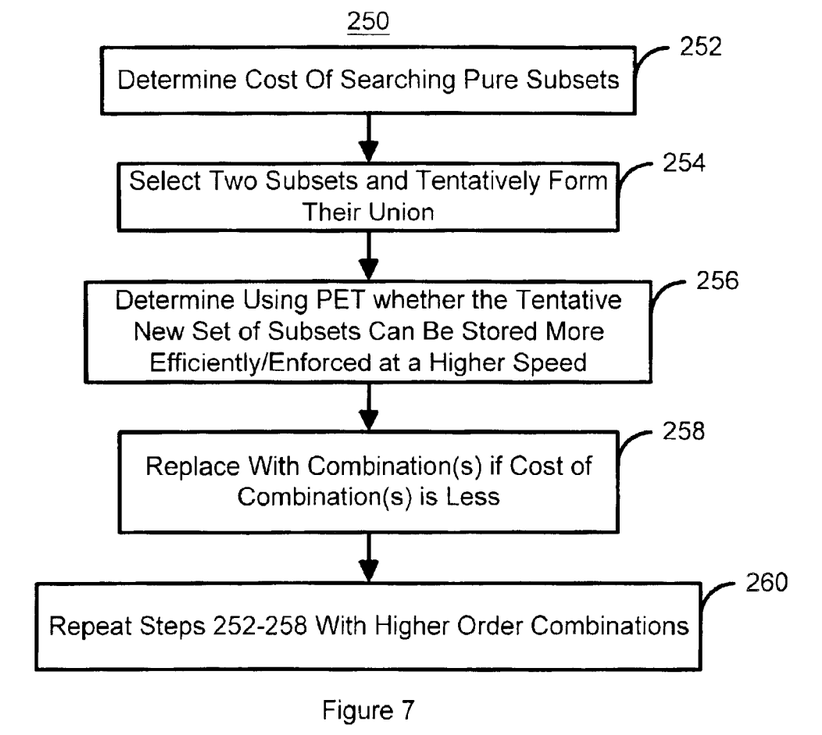
FIG. 7 is a flow chart depicting one embodiment of a method in accordance with the present invention for testing combinations of filter rules for improved efficiency.

FIG. 7 is a flow chart depicting one embodiment of a method 250 in accordance with the present invention for testing combinations of filter rules for improved efficiency. In a preferred embodiment, the method 250 may be used to perform the steps 154–160 of the method 150 depicted in FIG. 4. Referring back to FIG. 7, the method 250 is used in combining pairs of pure subsets. However, nothing prevents another embodiment of the method and system in accordance with the present invention from forming combinations with different numbers of subsets. The cost of searching the filter rules in the pure subsets is determined, via step 252. The cost determined in step 252 can be considered to be a baseline. A pair of subsets is selected and their union is formed to tentatively make a new set of subsets with one fewer subsets, via step 254. The speed of searching the pairs (combinations) of subsets and/or the cost of storing the new set of subsets versus the previous subsets is determined, via step 256. Step 256 is preferably performed using the PET 106 and takes into account different types of search engines that might be used. For example, each of two pure subsets may be searched using a full match algorithm. However, because the combination of two pure subsets may not be pure, the combination may require a more complex search mechanism such as a binary decision tree. If the cost of searching and/or efficiency of storing the union of a pair of pure subsets is less than the total cost of searching and/or the efficiency of storing both of the pure subsets, then the individual pure subsets are replaced by the combination of the pure subsets, via step 258. Step 258 is preferably performed for all of the pairs of pure subsets. In a preferred embodiment, after step 258 is performed a first time, the pure subsets of filter that are more efficiently searched when placed with a particular other pure subset have been combined. Steps 252–258 are then repeated to combine the subsets again and again until further combinations do not improve the speed of searching and/or the cost of storage, via step 260. In subsequent repetitions steps 252–258 operates on combinations of subsets, rather than pairs of pure subsets. For example, when steps 252–258 are first repeated, a pair of pure subsets that was saved on the previous pass may be combined with another pure subset or another pair of pure subsets. The next time steps 252–258 are repeated, pairs of pairs may be combined. This process is preferably continued until the cost of searching can no longer be improved by further combinations.

Thus, using the method 250, the pure subsets are typically combined and then recombined if performance improves. If it is determined that it is more efficient to search and/or store the union of two subsets than to search and/or store the pair subsets individually, then the two separate subsets are replaced by the union of the subsets. This process is repeated for other pairs of subsets and higher level combinations of subsets. As a result, the final combinations of rules saved have a lower storage cost, faster speed or some other improvement as measured by the PET 106. Consequently, performance of the computer system using the filter rules can be improved.

A method and system has been disclosed for partitioning and storing filter rules. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for storing a plurality of filter rules in a computer system, the plurality of filter rules using at least one range of values in at least one dimension, the method comprising the steps of:

partitioning a portion of the plurality of filter rules into a plurality of pure subsets of filter rules, each of the plurality of pure subsets of filter rules including at least one of the plurality of filter rules, at least one of the plurality of pure subsets including at least two of the plurality of filter rules, each of the portion of the plurality of filter rules in each of the plurality of pure subsets for each of the at least one dimension includes at least one of requiring an exact match, being completely a wildcard, and having a match requiring a common prefix with other of the portion of the plurality of filter rules in the each of the plurality of pure subsets;

combining a portion of the plurality of pure subsets of filter rules to provide a combined pure subset;

determining whether an efficiency of utilizing the plurality of filter rules is improved by combining the portion of the plurality of pure subsets of filter rules; and storing the plurality of filter rules including storing the portion of the plurality of filter rules as the combined subset if the efficiency of utilizing the plurality of filter rules is improved.

2. The method of claim 1 further comprising the step of:

recombining a second portion of the plurality of pure subsets of filter rules if the efficiency of utilizing the plurality of filter rules is not improved.

3. The method of claim 1 wherein the storing step results in a plurality of stored subsets, the method further comprising the steps of:

combining a portion of the plurality of stored subsets to provide a second combined subset;

determining whether an efficiency of utilizing the plurality of filter rules is improved by combining the portion of the plurality of stored subsets of filter rules; and storing the portion of the plurality of stored subsets including the storing the portion of the plurality of stored subsets as the second combined subset if the efficiency of utilizing the plurality of filter rules is improved.

4. The method of claim 3 further comprising the step of:

repeating the combining a portion of the plurality of stored subsets, determining whether the efficiency is improved by the combining of the portion of the plurality of stored subsets and storing the portion of the plurality of stored subsets steps until the efficiency of utilizing the plurality of filter rules is no longer improved.

5. The method of claim 3 further comprising the step of:
repeating the combining a portion of the plurality of stored subsets, determining whether the efficiency is improved by the combining of the portion of the plurality of stored subsets and storing the portion of the plurality of stored subsets steps until the efficiency of utilizing the plurality of filter rules reaches a particular level.

6. The method of claim 1 wherein the combining step further includes the step of:
combining a pair of the plurality of pure subsets of filter rules.

7. The method of claim 1 wherein the efficiency determining step further includes the step of:
determining whether a speed of enforcing the plurality of filter rules is improved by combining the portion of the plurality of pure subsets of filter rules.

8. The method of claim 1 wherein the efficiency determining step further includes the step of:
determining whether a cost of storing the plurality of filter rules is improved by combining the portion of the plurality of pure subsets of filter rules.

9. The method of claim 1 wherein the efficiency determining step further includes the step of:
determining whether a combination of a speed of enforcing the plurality of filter rules and a cost of storing the plurality of filter rules is improved by combining the portion of the plurality of pure subsets of filter rules.

10. A computer-readable medium containing a program for storing a plurality of filter rules in a computer system, the plurality of filter rules using at least one range of values in at least one dimension, the program including instructions for:
partitioning a portion of the plurality of filter rules into a plurality of pure subsets of filter rules, each of the plurality of pure subsets of filter rules including at least one of the plurality of filter rules, at least one of the plurality of pure subsets including at least two of the plurality of filter rules, each of the portion of the plurality of filter rules in each of the plurality of pure subsets for each of the at least one dimension includes at least one of requiring an exact match, being completely a wildcard, and having a match requiring a common prefix with other of the portion of the plurality of filter rules in the each of the plurality of pure subsets;
combining a portion of the plurality of pure subsets of filter rules to provide a combined pure subset;
determining whether an efficiency of utilizing the plurality of filter rules is improved by combining the portion of the plurality of pure subsets of filter rules; and
storing the plurality of filter rules including storing the portion of the plurality of filter rules as the combined subset if the efficiency of utilizing the plurality of filter rules is improved.

11. The computer-readable medium of claim 10 wherein the program further includes instructions for:
recombining a second portion of the plurality of pure subsets of filter rules if the efficiency of utilizing the plurality of filter rules is not improved.

12. The computer-readable medium of claim 10 wherein the storing instructions results in a plurality of stored subsets, the program further including instructions for:
combining a portion of the plurality of stored subsets to provide a second combined subset;
determining whether an efficiency of utilizing the plurality of filter rules is improved by combining the portion of the plurality of stored subsets of filter rules; and
storing the portion of the plurality of stored subsets including the storing the portion of the plurality of stored subsets as the second combined subset if the efficiency of utilizing the plurality of filter rules is improved.

13. The computer-readable medium of claim 12 wherein the program further includes instructions for:
repeating the combining a portion of the plurality of stored subsets, determining whether the efficiency is improved by the combining of the portion of the plurality of stored subsets and storing the portion of the plurality of stored subsets steps until the efficiency of utilizing the plurality of filter rules is no longer improved.

14. The computer-readable medium of claim 12 wherein the program further includes instructions for:
repeating the combining a portion of the plurality of stored subsets, determining whether the efficiency is improved by the combining of the portion of the plurality of stored subsets and storing the portion of the plurality of stored subsets steps until the efficiency of utilizing the plurality of filter rules reaches a particular level.

15. The computer-readable medium of claim 10 wherein the combining instructions further includes instructions for:
combining a pair of the plurality of pure subsets of filter rules.

16. The computer-readable medium of claim 10 wherein the efficiency determining instructions further includes instructions for:
determining whether a speed of enforcing the plurality of filter rules is improved by combining the portion of the plurality of pure subsets of filter rules.

17. The computer-readable medium of claim 10 wherein the efficiency determining step further includes instructions for:
determining whether a cost of storing the plurality of filter rules is improved by combining the portion of the plurality of pure subsets of filter rules.

18. The computer-readable medium of claim 10 wherein the efficiency determining instructions further includes instructions for:
determining whether a combination of a speed of enforcing the plurality of filter rules and a cost of storing the plurality of filter rules is improved by combining the portion of the plurality of pure subsets of filter rules.

19. A system for storing a plurality of filter rules in a computer system, the plurality of filter rules using at least one range of values in at least one dimension, the system comprising:
a processor for partitioning a portion of the plurality of filter rules into a plurality of pure subsets of filter rules, each of the plurality of pure subsets of filter rules including at least one of the plurality of filter rules and combining a portion of the plurality of pure subsets of filter rules to provide a combined subset, at least one of the plurality of pure subsets including at least two of the plurality of filter rules, each of the portion of the plurality of filter rules in each of the plurality of pure subsets for each of the at least one dimension includes at least one of requiring an exact match, being completely a wildcard, and having a match requiring a common prefix with other of the portion of the plurality of filter rules in the each of the plurality of pure subsets;

a performance evaluation tool for determining whether an efficiency of utilizing the plurality of filter rules is improved by combining the portion of the plurality of pure subsets of filter rules; and a memory for storing the plurality of filter rules including storing the portion of the plurality of subsets of filter rules as the combined subset if the efficiency of utilizing the plurality of filter rules is improved.

20. The system of claim 19 wherein the processor further recombines a second portion of the plurality of pure subsets of filter rules if the efficiency of utilizing the plurality of filter rules is not improved.

21. The system of claim 19 wherein memory includes a plurality of stored subsets and wherein the processor further combines a portion of the plurality of stored subsets to provide a second combined subset, wherein the performance evaluation tool further determines whether an efficiency of utilizing the plurality of filter rules is improved by combining the portion of the plurality of stored subsets of filter rules and wherein the memory further stores the portion of the plurality of stored subsets including the storing the portion of the plurality of stored subsets as the second combined subset if the efficiency of utilizing the plurality of filter rules is improved.

22. The system of claim 21 wherein the processor further recombines another portion of the plurality of stored subsets of filter rules and performance evaluation tool further redetermines whether the efficiency of utilizing the plurality of filter rules is improved by recombining the other portion of the plurality of pure subsets of filter rules until the efficiency of utilizing the plurality of filter rules is no longer improved.

23. The system of claim 22 wherein the processor further recombines another portion of the plurality of stored subsets of filter rules and performance evaluation tool further redetermines whether the efficiency of utilizing the plurality of filter rules is improved by recombining the other portion of the plurality of stored subsets of filter rules until the efficiency of utilizing the plurality of filter rules reaches a particular level.

24. The system of claim 19 wherein the processor combines the portion of the plurality of filter rules by combining a pair of the plurality of pure subsets of filter rules.

25. The system of claim 19 wherein the performance evaluation tool determines the efficiency of utilizing the plurality of filter rules by determining whether a speed of enforcing the plurality of filter rules is improved by combining the portion of the plurality of pure subsets of filter rules.

26. The system of claim 19 wherein the performance evaluation tool determines the efficiency of utilizing the plurality of filter rules by determining whether a cost of storing the plurality of filter rules is improved by combining the portion of the plurality of pure subsets of filter rules.

27. The system of claim 19 wherein the performance evaluation tool determines the efficiency of utilizing the plurality of filter rules by determining whether a combination of a speed of enforcing the plurality of filter rules and a cost of storing the plurality of filter rules is improved by combining the portion of the plurality of pure subsets of filter rules.

* * * * *